United States Patent [19]

Pedersen

[11] 4,054,030
[45] Oct. 18, 1977

[54] VARIABLE CYCLE GAS TURBINE ENGINE

[75] Inventor: George H. Pedersen, Indianapolis, Ind.

[73] Assignee: General Motors Corporation, Detroit, Mich.

[21] Appl. No.: 681,464

[22] Filed: Apr. 29, 1976

[51] Int. Cl.² .............................. F02K 3/06; F02K 3/12
[52] U.S. Cl. ..................................... 60/262; 60/226 R; 60/224; 60/39.33; 415/500; 415/145
[58] Field of Search ....................... 60/224, 226 R, 262, 60/39.33; 415/79, 145, 500

[56] References Cited

U.S. PATENT DOCUMENTS

| | | | |
|---|---|---|---|
| 3,002,675 | 10/1961 | Howell et al. | 415/79 |
| 3,255,585 | 6/1966 | Grieb | 415/79 |
| 3,677,012 | 7/1972 | Batscha | 60/262 |
| 3,792,584 | 2/1974 | Klees | 415/79 |
| 3,878,677 | 4/1975 | Colvin | 415/500 |

Primary Examiner—Carlton R. Croyle
Assistant Examiner—Robert E. Garrett
Attorney, Agent, or Firm—J. C. Evans

[57] ABSTRACT

A variable cycle air breathing gas turbine engine includes a core engine having a combustor, a high pressure turbine stage and a low pressure stage and wherein the high pressure stage drives a compressor for the core engine and the low pressure stage drives a bypass fan for the engine. The low pressure turbine stage includes a row of tip mounted blades located in a first bypass duct and the engine includes auxiliary inlets and crossover valve means for directing air through the first bypass duct during a first mode of engine operation to cause the tip blades on the low pressure turbine stage to operate as an auxiliary bypass fan while the primary fan is driven during the first mode to produce a bypass ratio in a second bypass duct. During a second engine operating mode crossover valve means are conditioned to communicate the first bypass duct with the primary fan and a second combustor element in the first bypass duct is operated to produce flow of motive fluid across the tip blades to drive the blades as a reaction turbine to produce a high temperature turbojet cycle of engine operation.

4 Claims, 4 Drawing Figures

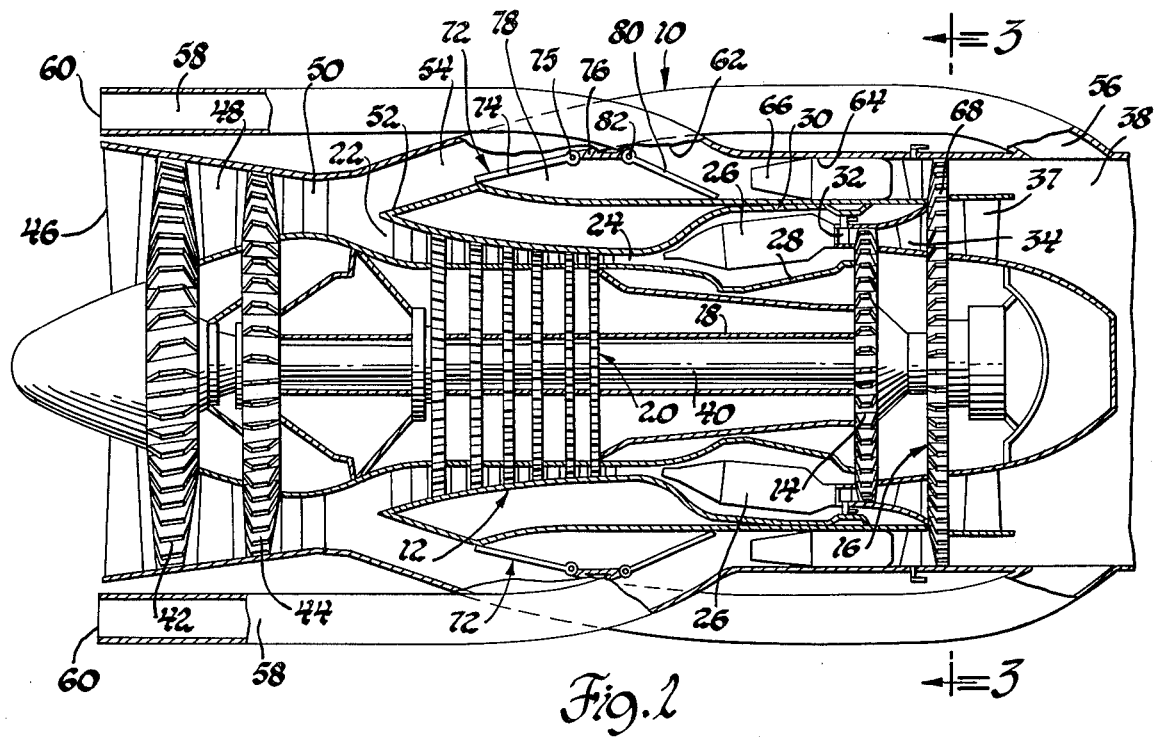
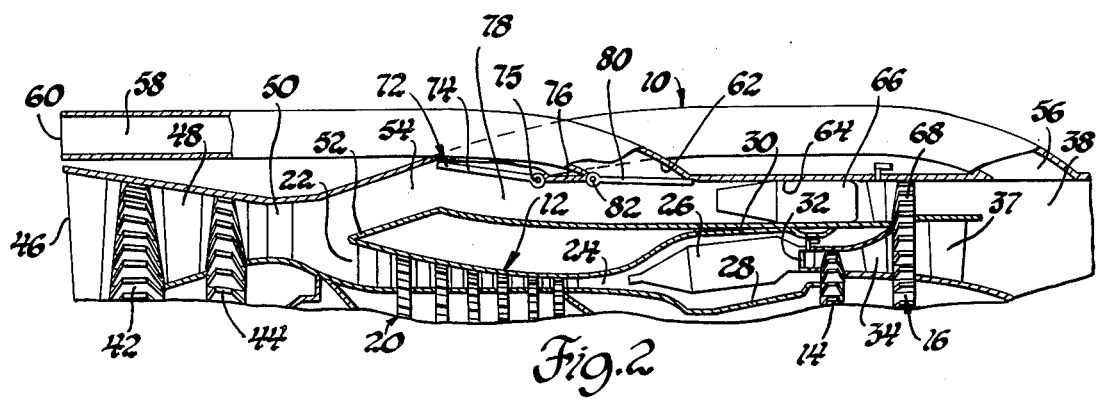
Fig. 2
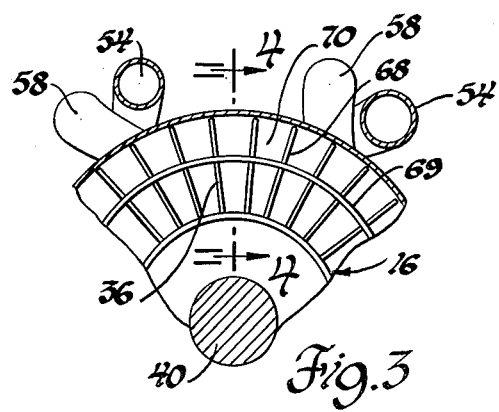
Fig. 3
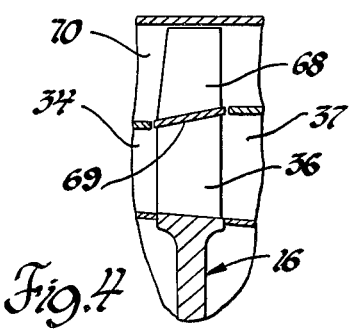
Fig. 4

VARIABLE CYCLE GAS TURBINE ENGINE

This invention relates to variable cycle gas turbine engines including a core engine having a low pressure and a high pressure turbine stage for driving a high pressure stage compressor and a bypass fan and wherein blade means are located on the tip of the low pressure turbine within a bypass duct and associated with selectively energized combustor means to produce either a bypass compressor mode of operation when the combustor is off or a supersonic bypass turbine mode of operation when the combustor is operated to burn bypass air.

Various multicycle engines have been proposed to vary the engine cycles of a fan bypass gas turbine engine of the type including a core engine having a low pressure and a high pressure turbine stage for operating a compressor to supply air to a core engine combustor and to drive a bypass fan respectively. An example of such a multicycle engines is set forth in U.S. Pat. No. 3,938,328 issued Feb. 17, 1976, to Klees wherein first and second combustors are provided in association with flow inverting valve means to produce a high pressure mode of operation wherein both the high and low pressure turbines are driven by air burned through a core engine combustor and wherein valve means are conditioned to divert inlet air from a bypass fan to a second combustor for driving the low pressure stage of the core engine during a low bypass ratio mode of operation wherein exhaust from the core engine combustor is diverted from the low pressure stage and passed directly into the engine bypass duct.

Accordingly, an object of the present invention is to provide an improved variable cycle gas turbine engine including a bypass fan and a core engine including a high pressure and a low pressure turbine stage by the provision of an extra blade row on the outer periphery of the low pressure turbine stage located in a bypass duct and including a converging flow passage therethrough and being associated with air diverting valve means and auxilary combustor means selectively operated to produce operation of the external blade row either as a compressor or as a turbine in accordance with engine operating modes.

Still another object of the present invention is to provide a variable cycle gas turbine engine including a core engine having a high pressure stage and a low pressure turbine stage connected through a two shaft drive to operate a high pressure compressor for the core engine to supply air to its combustor and to drive an engine bypass fan respectively; and wherein a blade row is located on the outer pheriphery of the low pressure turbine within a bypass duct including a converging flow passage therethrough and associated with a combustor and air director means to operate the blade row as a bypass compressor when the auxilary combustor element is off and to operate it as a bypass turbine when the bypass combustor is on to produce either a bypass ratio supplemental to that of the engine fan during a first engine operating mode or to cause the external blade row to be driven as a turbine to direct additional power to the engine fan during a second mode of engine operation.

A further object of the present invention is to improve variable cycle gas turbine engines by including means to produce a turbojet cycle of operation (a maximum temperature mode of operation) for producing high engine thrust and wherein means are provided in the engine to produce a high bypass ratio in fan ducts of the engine at subsonic cruise operation and to do so by an auxilary bypass duct having a blade row located therein connected to the outer periphery of a low pressure turbine stage of a core engine and wherein the blade row has converging blade passages therein for causing the blade row to act as a compressor of air supplied thereto through an auxilary inlet and crossover duct means during a subsonic cruise mode of operation and wherein auxilary combustor means are provided in the auxilary bypass duct during the maximum temperature mode of operation to cause the blade row to act as a bypass turbine to produce a maximum temperature turbojet cycle operation.

Still another object of the present invention is to provide an improved variable cycle angine including a core engine having a combustor, high pressure and low pressure turbine stages for driving a high pressure turbine compressor for supplying air to the combustor and a bypass fan of the engine, respectively; and including a blade row connected to the periphery of the low pressure turbine stage and located in a bypass duct; the engine further including a fan duct bypassing the blade row from the engine bypass fan and exiting at a separate nozzle system and wherein the blade row is operable as a fan with air supplied through auxiliary inlets and crossover valve means to increase the system bypass ratio and reduce sfc during a cruise mode of operation; the blade row having a converging flow passage therethrough to reduce high velocity inlet air flow to a lower velocity level at the blade exit during the high bypass ratio mode of operation; and wherein an auxiliary combustor is provided in the bypass duct and the crossover valve means are positioned to cause direct air flow from the engine bypass fan to the auxiliary combustor to produce a high temperature mode of operation with the blade row acting as a reaction turbine to produce a turbojet mode of operation.

Further objects and advantages of the present invention will be apparent from the following description, reference being had to the accompanying drawings wherein a preferred embodiment of the present invention is clearly shown.

FIG. 1 is a schematic view of a variable cycle engine including the present invention in a first operating mode;

FIG. 2 is a schematic view of the engine in FIG. 1 in a second operating mode;

FIG. 3 is a cross sectional view taken along the line 3—3 of FIG. 1 looking in the direction of the arrows; and FIG. 4 is a cross sectional view taken along the line 4—4 of FIG. 3 looking in the direction of the arrows.

Referring now to the drawings, FIG. 1 shows a variable cycle engine 10 including a core engine 12 having a high pressure turbine stage 14 and a low pressure stage 16. The high pressure turbine stage 14 has its hub connected to a shaft 18 for operating a multi-stage compressor 20 having an inlet 22 and an outlet 24 for supplying air to a plurality of combustion burners 26 located circumferentially around an inner annular casing 28 and radially inwardly of an outer liner 30.

The outlet of each of the burners 26 discharge through a turbine inlet nozzle 32 and across the blades of the high pressure turbine stage 14 and are thence discharged through a diffuser passageway 34 across the blade row 36 of the low turbine pressure stage 16 thence to be discharged through an outlet nozzle 37 to the exhaust duct 38 of the engine.

The low pressure turbine 16 is connected by a shaft 40 to forwardly located bypass fans 42, 44 downstream of a bypass inlet 46 to a bypass fan duct 48 having its outlet 50 divided by a splitter 52 for air flow into the inlets 22 of first bypass ducts 54 with an exhaust through separate nozzles 56. Details of the gear boxes, fuel supply and other details are omitted since their form may vary in practicing the present invention. Reference may be had to U.S. Pat. No. 2,952,973 issued Sept. 20, 1960, to Hall et al and U.S. Pat. No. 3,019,603 issued Feb. 6, 1962, to Kreutzer for examples of such details with it being understood that they form no part of the present invention.

The basic core engine 12 is associated with a plurality of auxiliary air inlet ducts 58 each having an upstream opening 60 and an outlet 62 in communication with a second fan bypass duct 64 having a plurality of combustor burner elements 66 spaced circumferentially therearound as best seen in FIG. 3.

The low pressure turbine stage 16, in addition to the low pressure turbine blade row 36, includes a second row of blades 68 thereon extending radially outwardly of the outer periphery of an intermediate annular shroud wall 69. Adjacent blades 68 form a flow passage 70 that converges from the upstream end to the exit end of the blade row 68 as best shown in FIG. 4.

In the illustrated arrangement, area contraction in passage 70 is taken in the intermediate annular shroud wall 69 which is located between the low pressure stage blade row 36 and the blade row 68.

In accordance with certain principles of the present invention the blade row 68 functions either as a compressor or a turbine depending upon engine operating mode.

Engine operating modes are established by means of a plurality of air flow control crossover valve assembly 72 shown schematically in FIGS. 1 and 2. Each assembly 72 includes a first air diverting valve 74 pivoted at one end by a pin 75 secured to a frame 76. Valve 74 is movable with respect to the splitter 52 to either close air flow through a bypass duct 54 and to concurrently open a passage (FIG. 2) to a bypass duct 64 or open duct 54 and close passage 78 (FIG. 1). The value assembly 72 includes a second valve 80 pivotally mounted at one end by a pin 82 on frame 76 for movement between a closed position as shown in FIG. 2 to block air flow through an auxilairy inlet duct 58 and to define a portion of the passage 78 or to be positioned in conjunction with the first described valve element 74 (FIG. 1) to block the passage 78 and to open air flow through both the fan bypass duct 54 and the auxiliary inlet duct 58.

The valve assemblies 72 are positioned in FIG. 1 to provide an air flow path through the engine 10 to produce a subsonic mode of operation. In this mode, valve 74 is positioned so discharge air from the forward fans 42, 44 is ducted around the tip blade row 68 on the low pressure turbine 16 to pass through the bypass ducts 54 and out the separate nozzles. 56. The core engine 12 is operated so that the burners 26 are heating inlet air and a part of the fan discharge is directed through the inlet 22 and across the high pressure compressor 20 which has its discharge combined with fuel in burners 26 to produce motive fluid for operating both the high pressure turbine stage 14 and the low pressure stage 16. Concurrently, during the aforesaid mode of operation, the valve 74 is positioned to open the auxiliary inlet ducts 58 to direct air into the bypass duct 64 and the motive fluid flow across the low pressure turbine blade row 36 will drive the blade row 68 on the tip of the turbine stage 16 to cause the blade 68 thereon to act as compressors to produce an increased system bypass pressure ratio to reduce the scf requirements of the engine under cruise modes of operation. The blades 68, in the illustrated embodiment of the invention, are shown as zero cambered blades. However, the concept of the present invention is equally suited for use with cambered blades. With the illustrated contracting area of flow through the passages 70 as provided by the shroud wall 69 pressure ratios up to 2.0 can be efficiently generated.

The pressure ratio across the fan stages 42, 44 is also maintained through the ducts 54 to produce a resultant overall improvement in system bypass ratio. The blade configuration also is desirable during a cruise mode of operation wherein supersonic air flow is directed through the auxiliary inlets 58. The provision of the converging passages 70 will reduce the supersonic inlet velocity to a lower level at the blade exit in the bypass fan mode.

During subsonic cruise mode of engine operation, power to drive the primary bypass fans 42, 44 and the blade row 68, which acts as a secondary fan in the system, is supplied by the low pressure turbine blade row 36. In order to produce a desired control of combustion products across both the high pressure turbine stage 14 and the blade row 36 of the low pressure turbine stage during this mode of operation, it may be desirable to include variably positioned inlet control blades in the nozzle assembly 32.

The second mode of operation is a parallel flow turbojet mode of operation. In this mode, the valve assemblies 72 are positioned as shown in FIG. 2 to close the bypass ducts 54 and the auxiliary air inlets 58. The valve elements 74, 80 are thus pivoted about the support frame 76 to form the crossover passage 78 in part formed by the splitter 52 as shown in FIG. 2. During this mode of operation both the core engine burners 26 and the burners 66 are operated concurrently. Burners 26 pass combustion products across the high pressure turbine and low pressure turbine stages 14, 16. Burners 66 combust inlet air from the primary fan stages 42, 44 and the crossover passage 78 (air flow through the engine parallel to that through the core engine 12) and directs it across the outer blade row 68. Blade row 68 is driven as a reaction turbine during this mode of operation. Since the area of passages 70 is contracting between each of the blades 68 there is a supplemental work output from the blade row 68 which acts on the low pressure turbine stage 16 to increase power input to the fans 42, 44 to improve engine efficiency.

While the embodiments of the present invention, as herein disclosed, constitute a preferred form, it is to be understood that other forms might be adopted.

The embodiments of the invention in which an exclusive property or privilege is claimed are defined as follows:

1. In a gas turbine engine having a first fan bypass duct with a bypass fan located therein and operative to produce a first bypass pressure ratio between the inlet and outlet of the first duct, the improvement comprising, means for driving said bypass fan and including a first shaft, a low pressure turbine on one end of said first shaft, a second fan bypass duct, a dual bypass turbine and compressor unit connected on said one end of said first shaft and including a blade row located thereon within said second fan bypass duct, an auxiliary air inlet duct and variable geometry valve means coacting for directing air into said second fan bypass duct during a first mode of engine operation, a second shaft, means including a high pressure turbine for driving said second shaft, gasifier means on said second shaft, first combustor means receiving gas from said gasifier means and operative during the first mode of engine operation to direct combustion products across said high and low pressure turbines to drive said bypass fan and said gasifier means along with said blade row within said second fan bypass duct to produce a first turbojet stream from said engine and a first predetermined fan bypass pressure ratio across the first and second fan bypass ducts, second combustor means for receiving compressed air from said bypass fan, and means including said variable geometry valve means for blocking said auxiliary air inlet and directing air flow from said bypass fan through said second combustor means and across said blade row during a second engine operating mode to produce a power input to said first shaft supplemental to that of said low pressure turbine.

2. In a gas turbine engine having a first fan bypass duct with a bypass fan located therein and operative to produce a first bypass pressure ratio between the inlet and outlet of the first duct, the improvement comprising, means for driving said bypass fan and includng a first shaft, a low pressure turbine on one end of said first shaft, a second fan bypass duct, a dual bypass turbine and compressor unit connected on said one end of said first shaft and including a blade row located thereon within said second fan bypass duct, said bypass turbine and compressor unit including a shroud ring on the outer periphery of said low pressure turbine, means including said shroud ring defining converging flow passages from the inlet to exit of said blade row, a second shaft, an auxiliary air inlet duct and variable geometry valve means coacting for directing air into said second fan bypass duct during a first mode of engine operation, means including a high pressure turbine for driving said second shaft, gasifier means on said second shaft, first combustor means receiving gas from said gasifier means and operative during a first mode of engine operation to direct combustion products across said low and high pressure turbines to drive said bypass fan and said gasifier means along with said blade row within said second fan bypass duct to produce a first turbojet stream from said engine and a first predetermined fan bypass pressure ratio across the first and second fan bypass ducts, second combustor means for receiving compressed air from said bypass fan, and means including said variable geometry valve means for blocking said auxiliary air inlet and directing air flow from said bypass fan through said second combustor means and across said blade row during a second engine operating mode to produce a power input to said first shaft supplemental to that of said low pressure turbine.

3. A variable cycle gas turbine engine having a high pressure compressor and a first fan bypass duct with a bypass fan located therein, core engine means including a first combustor and having a high pressure turbine stage and a low pressure turbine stage, a two shaft drive connected to said turbine stages to operate said high pressure compressor to supply air to said first combustor and to drive said engine bypass fan respectively, a second fan bypass duct, a blade row located on the outer periphery of said low pressure turbine stage within said second fan bypass duct and means defining a converging flow passage through the blade row, an auxiliary air inlet duct and variable geometry valve means coacting for directing air into said second fan bypass duct during a first mode of engine operation, a second combustor, said variable geometry valve means being operable to cause the blade row to be driven as a bypass compressor when the second combustor is off and to operate it as a bypass turbine when the second combustor is on to produce a bypass ratio supplemental to that of the bypass fan during the first mode of engine operation and to cause the blade row to be driven as a turbine to direct additional power to the bypass fan during a second mode of engine operation.

4. A variable cycle engine comprising a core engine having a combustor and high pressure and low pressure turbine stages, a high pressure turbine compressor driven by said high pressure turbine stage for supplying air to the combustor, means including a first fan bypass duct with a bypass fan of the engine therein driven by said low pressure turbine stage, a second fan bypass duct, a blade row connected to the periphery of the low pressure turbine stage and located in said second fan bypass duct, a separate nozzle system bypassing said core engine, means including auxiliary air inlets and crossover valve means with first and second control positions for directing air into said second fan bypass duct during a first mode of engine operation, said blade row being operable as a fan when said cross-over valve means is in its first control position with air supplied through said auxiliary inlets to increase the system bypass ratio and reduce sfc during a cruise mode of operation, means associated with said blade row for defining a converging flow passage therethrough to reduce high velocity inlet air flow to a lower velocity level at the blade row exit during a high bypass ratio mode of operation, an auxiliary combustor located in said second fan bypass duct, said crossover valve means being in its second control position when said auxiliary combustor is on to cause direct air flow from the engine bypass fan to the auxiliary combustor to produce a high temperature mode of operation with the blade row acting as a reaction turbine during a second mode of engine operation to produce a power input to said bypass fan supplimental to that of said low pressure turbine stage.

* * * * *